United States Patent Office 3,369,156
Patented Feb. 13, 1968

3,369,156
LINE DISTANCE PROTECTIVE DEVICE UTILISING ULTRA-RAPID STATIC RELAYS
Michel Henry Pierre Souillard, Paris, France, assignor to Compagnie Des Compteurs, Paris, France, a company of France
Filed Jan. 19, 1966, Ser. No. 521,680
Claims priority, application France, Jan. 22, 1965, 2,908
6 Claims. (Cl. 317—36)

The present invention has an object a line distance protective method and device utilising ultra-rapid static relays, that is to say operating within a time at most equal to half a cycle counting from the appearance of the fault in a line fed with alternating current.

The difficulty of producing line distance protective devices operating within an extremely short time is in particular due to the fact that the mode of operation of these devices was determined for sinusoidal magnitudes (voltages, currents), whereas when a fault appears it is necessary to take into account the aperiodic transient state which generally sets in at that moment.

The invention aims at obviating this disadvantage, by providing a protective device independent of the form of the transient signals produced by the fault.

According to the invention the distance protective method for A.C. fed line comprising ultra-rapid protective devices to shut off feeding upon appearance of a fault is characterized in that we determine the moment at which an instantaneous electrical magnitude proportional to the fault current becomes zero, in which we cause a pulse or signal to be formed at the above considered moment, in which we cause said pulse to be used at said moment for comparing a first and second instantaneous electrical voltages, the first of which is issued from a reference impedance traversed by a current proportional to the fault current and the second of which is a function of the voltage at the origin of said line, in which we cause, in the sense of logical algebra, the product of signs of said first and second electrical voltages to be effected, in which we cause a permanent electrical order to be formed for only one of said signs (either a positive or a negative sign) of said product of said voltage, sign which corresponds to a fault in the line and in which we cause said protecting devices to be controlled by said permanent electrical order for actuation thereby.

The invention includes also a device embodying the above method which method and device will be clearly understood as to its principle by considering a number of embodiments which are described and illustrated by way of example, without any limitative character, in the following description.

FIGURE 1 shows a bifilar line fed at one end by a source S of alternating voltage. A designates a station where the protective device is connected, that is to say near one end of the section of line to be supervised and protected.

Figure 1:
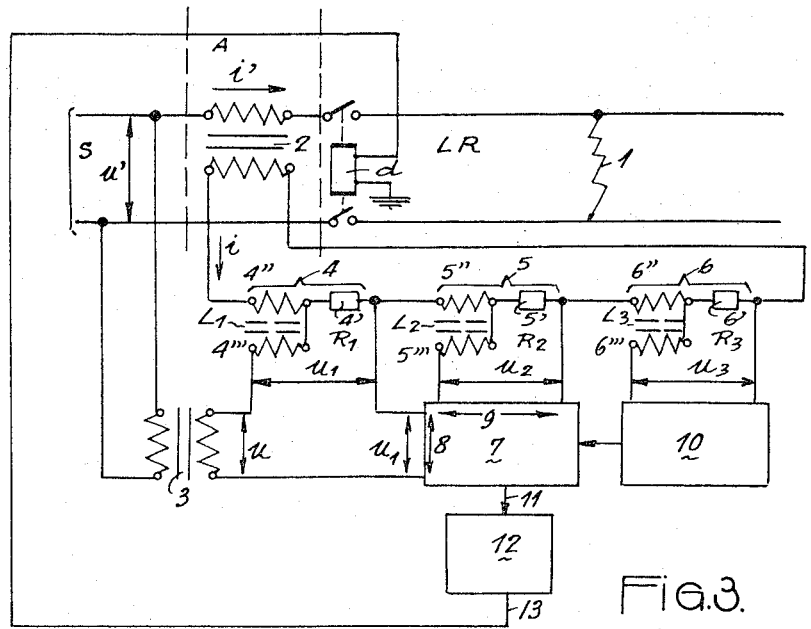
FIGURE 1 is a diagram illustrating a first form of construction of the protective device according to the invention, making it possible to compare the impedance of the line with a reference impedance in the event of a fault between phases.

In a manner known per se, the entire line, divided into sections, has $n$ identical stations.

It is assumed that a fault 1 appears at a certain distance from the station A. The impedance between the fault 1 and the station A is determined by the self-inductance L and the resistance R of the defective loop, this resistance R including the inherent resistance of the fault.

The instantaneous values of the voltage and current at the origin of the defective loop are then respectively $u'$ and $i'$.

2 designates a current transformer, the primary winding of which is connected in series in the line, and the secondary winding of which supplies a current $i$ which is proportional to the current $i'$.

3 designates a voltage transformer, the primary winding of which is connected to the terminals of the source S and the secondary winding of which supplies a voltage $u$ which is proportional to $u'$.

In order to facilitate understanding of the following and moreover of what must actually be done in practice, it should be indicated at once that the transformation ratio of the current transformer 2 and voltage transformer 3 is equal to unity, that is to say that $u'=u$ and $i'=i$, thus making it unnecessary to introduce coefficients in the calculation relations given hereinbelow in order to enable the invention to be clearly understood.

The secondary winding of the current transformer 2 serves for feeding and is consequently closed on three circuits designated generally by the references 4, 5 and 6 and connected in series:

Circuit 4 comprises a resistor 4' of value $R_1$ and the primary winding 4" of a mutual inductance the mutual inductance coefficient of which is $L_1$;

Circuit 5 comprises a resistor 5' of value $R_2$ and the primary winding 5" of a mutual inductance the mutual inductance coefficient of which is $L_2$;

Circuit 6 comprises a resistor 6' of value $R_3$ and the primary winding 6" of a mutual inductance the mutual inductance coefficient of which is $L_3$.

$u_1$ designates the value of the instantaneous voltage which appears between the end terminals of the resistor 4' and of the secondary winding 4''' of the mutual inductance of the circuit 4.

$u_2$ designates the value of the instantaneous voltage which appears between the end terminals of the resistor 5' and of the secondary winding 5''' of the mutual inductance of the circuit 5.

$u_3$ designates the value of the instantaneous voltage which appears between the end terminals of the resistor 6' and of the secondary winding 6''' of the mutual inductance of the circuit 6.

The secondary winding of the voltage transformer 3 in series with the winding 4''' of the mutual inductance and of the resistor 4' of the circuit 4 is connected to the terminals of an instantaneous polarity comparator 7, in such a manner that the instantaneous voltage $u_4$ applied between the terminals 8 will be equal to $u-u_1$.

The instantaneous voltage $u_2$ is applied to the second pair of terminals 9 of the instantaneous polarity comparator 7.

The instantaneous voltage $u_3$ is applied to the terminals of a pulse generator 10 which transmits pulses of short duration when said voltage $u_3$ passes to zero.

The pulse generator 10 is connected to the comparator 7 and causes the latter to operate as soon as the comparator receives a pulse. The comparator 7 supplies a signal at its output terminals 11 only for a single state of coincidence of the polarities of the voltage $u_2$ and $u_4$. In other words, the polarity comparator supplies an output order when the product of the voltages $u_4 \times u_2$ has a certain sign, for example a negative sign, and issues the complementary order (in the sense of logical algebra) when this product assumes the contrary sign, for example the positive sign.

The signal of the comparator 7 is applied to a monostable amplifier 12 which converts the pulse or signal coming from the terminals 11 into a permanent order and which, in these circumstances, supplies at its output terminals 13 an electrical power which acts on the protective device of station A, which device is illustrated in the drawing at $d$ as a cut-out intended to open the circuit containing the fault in order, where necessary, to effect the rapid extinction of the arc due to this fault.

The instantaneous polarity comparator 7 may be constructed in various well known manners used in the art, and does not in itself form part of the invention. In fact, said comparator 7 is any logical circuit device intended to effect a comparison of two analogue magnitudes which, referring to FIGURE 7, may be designated $\alpha$ and $\beta$, the polarities of which it is desired to compare.

Figure 7:
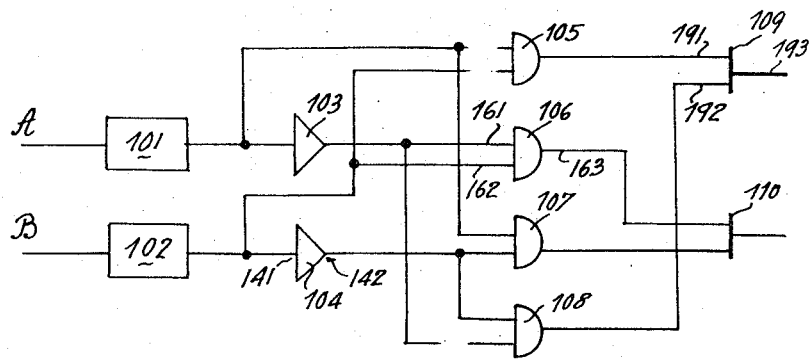
FIGURE 7 is a diagram of a logical circuit device illustrating a possible form of construction of one of the elements illustrated in FIGURE 1.

According to FIGURE 7, 101 and 102 designate the analogue-to-logical converters, comprising for example saturated amplifiers ensuring that the output of said converters will be in logical state 1 when the input magnitude is positive and will be in logical state 0 when the input magnitude is negative. Inverter circuits 103, 104 make it possible to have complementary logical magnitudes available, that is to say the output 142 of the inverter 104 for example can be in logical state 1 if its input 141 is in logical state 0, that is to say if the output of the converter 102 is in state 0, whence it results that $\beta$ is negative. In this manner, the four possible comparisons of the polarities of the magnitudes $\alpha$ $\beta$ are:

$$\alpha > 0 \ \beta > 0, \ \alpha < 0 \ \beta > 0, \ \alpha > 0 \ \beta < 0, \ \alpha < 0 \ \beta < 0$$

to which four logical equations correspond:

$$AB=1, \ \overline{A}B=1, \ A\overline{B}=1, \ \overline{AB}=1$$

In these equations, the magnitudes overligned represent the complementary magnitudes. The equation $\overline{A}B=1$ for example is resolved only by $\overline{A}=1$ and $B=1$, that is to say that $A=0$ and $B=1$.

In known manner, and referring again to FIGURE 7, the above logical equations are resolved by circuits such as the circuits 105, 106, 107, 108 which are logical circuits of the type AND.

The circuit 106 for example is fed at its input terminals 161, 162 by the magnitudes $\overline{A}$ and B. It is known that the output 163 of the circuit 106 is in state 1 if the inputs 161 and 162 are in state 1, and it is in state 0 in all other cases.

In the application according to the present invention to the distance protective device which is the object thereof, the only interesting factor is the sign of the product of the analogue magnitudes $\alpha \times \beta$. It is therefore necessary ot regroup on one side the cases $\alpha > 0, \beta > 0, \alpha < 0, \beta < 0$, and on the other side the cases $\alpha > 0, \beta < 0, \alpha < 0, \beta > 0$.

Additions are then made by logical circuits of the OR type, such as the circuits 109 and 110. In this case the circuit 109 for example receives at its inputs 191 and 192 the output magnitudes of the circuits 105 and 108. The output of circuit 109, designated by 193, is obviously equal to 1 if the input 191 or the input 192 is equal to 1. The circuit provides the function $AB + \overline{AB} = 1$.

In the same manner the circuit 110 fed by the outputs of the circuits 106 and 107 provides the function $\overline{A}B + A\overline{B} = 1$.

The foregoing is obviously only a simple reminder of known facts and it is also evident that the logical circuits may be formed in numerous manners by utilising electromechanical, pneumatic, magnetic, or semiconductor components.

In the foregoing it has been indicated that according to the invention the pulse generator 10 illustrated in FIGURE 1 is connected to the comparator 7 and operates the latter as soon as the comparator receives the pulse. Here again this may be achieved in various manners well-known to the technician, because this action may be likened in a general way to the prevention of the transmission of the output order 11 of the polarity comparator 7 when no pulse is present at the output at the pulse generator 10.

In order to illustrate this by a concrete example reference may be made to FIGURE 8, which once again shows the logical circuit device illustrated in FIGURE 7 limited to the elements necessary according to the invention and in which the analogoue magnitude $\alpha = u$ and the analogue magnitude $\beta = u_2$.

In this case a logical analogue converter 111 is fed by the previously rectified voltage $u_3$ and at the output of the converter 111 an inverter stage is provided which enables pulses of logical state 1 to be made available at its output when the voltage $u_3$ passes through 0.

In this case the output of the logical circuit 110 of the OR type is equal to 1 when the product of the voltages $u$ and $u_2$ is negative.

By providing a circuit 113 of the AND type connected to the output of the circuit 110 and to the output of the inverter stage 112, the effect is achieved that the output of the circuit 113 is equal to 1 only when these inputs are in state 1. Consequently, we have at one and the same time $u_3 = 0$ and $u \times u_2 < 0$.

Now that it has been shown how the polarity comparator 7 and pulse generator 10 can be produced by means which in themselves are known, it must now be considered that whatever the law of variation in time of the complex instantaneous magnitudes of voltage and current in their more general form $i = F(t)$ and $$u = R \times F(t) + L\frac{dF(t)}{dt} = \varphi(t)$$

throughout the duration of the aperiodic transient conditions which follow the appearance of a fault in the line, through the construction described with reference to FIGURE 1 the instantaneous values of electrical magnitudes $i$, $u$, $u_2$, $u_3$ and $u_4$ are all expressed by the following relations, because the above-mentioned laws of variation of voltage and current do not bring into action—and this is one of the advantages of the arrangement according to the invention—magnitudes such as frequency, phase, and effective amplitude which are valid only in periodic established conditions.

As stated above:

$$i = i' \tag{1}$$

$$u = u' = Ri + L\frac{di}{dt} = Ri' + L\frac{di'}{dt} \tag{2}$$

$$u_1 = R_1 i + L_1 \frac{di}{dt} \tag{3}$$

$$u_2 = R_2 i + L_2 \frac{di}{dt} \tag{4}$$

$$u_3 = R_3 i + L_3 \frac{di}{dt} \tag{5}$$

The voltage $u_4$ being equal to $u-u_1$ is therefore expressed as follows:

$$u_4 = (R-R_1)i + (L-L_1)\frac{di}{dt} \qquad (6)$$

According to one characteristic of the invention, the comparison of the polarities of the instantaneous values of the voltages $u_2$ and $u_4$ is effected in the comparator 7 at the moment when a pulse is supplied by the generator 10 at the instant when the voltage $u_3$ becomes zero, that is to say at the moment when $$u_2 = (R_2 - L_2)\left(\frac{R_3}{L_3}\right)i$$

which is obviously not zero. At this moment the relation (5) given above becomes:

$$0 = R_3 i + L_3 \frac{di}{d_1} \text{ and } \frac{di}{dt}$$

is expressed as $$\frac{di}{dt} = -\frac{R_3}{L_3}i$$

By inserting this value of $di/dt$ in the expressions (6) and (4), we obtain:

$$u_4 = R_3 \cdot i \left[\frac{R-R_1}{R_3} - \frac{L-L_1}{L_3}\right]$$

$$u_2 = R_3 \cdot i \left[\frac{R_2}{R_3} - \frac{L_2}{L_3}\right]$$

The product $u_4 \times u_2$ is positive if the polarities of the instantaneous voltages $u_4$ and $u_2$ are the same and negative in the opposite case.

This product is expressed as follows:

$$u_4 \cdot u_2 = R_3^2 \cdot i^2 \left[\frac{R-R_1}{R_3} - \frac{L-L_1}{L_3}\right] \cdot \left[\frac{R_2}{R_3} - \frac{L_2}{L_3}\right]$$

The sign of this product does not depend on the term $i^2$ which is always positive, or on the expression $$\frac{R_2}{R_3} - \frac{L_2}{R_3}$$

the value of the different terms of which is suitably selected so that it will always be positive.

The sign of this product therefore depends only on the sign of the expression $$\frac{R-R_1}{R_3} - \frac{L-L_1}{L_3}$$

that is to say in the end on the values RL of the impedance seen at station A.

The conjugate values of L and of R which give the expression $$\frac{R-R_1}{R_3} - \frac{L-L_1}{L_3}$$

a zero value make it possible to define for the co-ordinates L and R a straight line D (FIG. 2) the angular coefficient of which is $L_3/R_3$ and which passes through a point P the co-ordinates of which are $R_1$ and $L_1$. This straight line divides the plane of the co-ordinates L and R into two half-planes such that the sign of the expression $$\frac{R-R_1}{R_3} - \frac{L-L_1}{L_3}$$

will be positive in one and negative in the other.

Figures 2, 3:
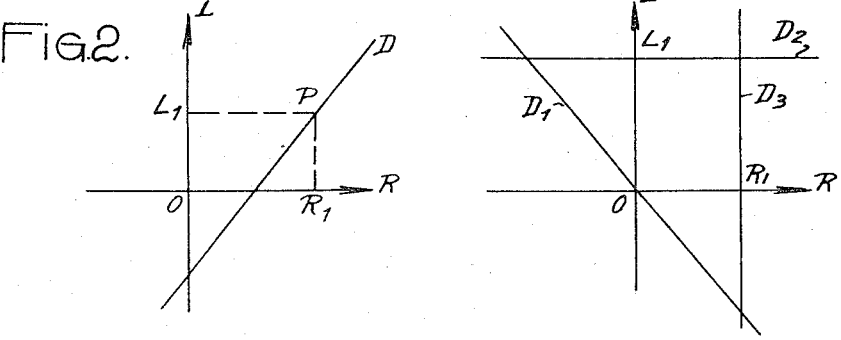
FIGURES 2, 3 and 4 are diagrams relating to the operation of the protective device illustrated in FIGURE 1, in different cases.

Obviously, the different parameters $L_1$, $R_1$, $L_3$ and $R_3$ of the expression $$\frac{R-R_1}{R_3} - \frac{L-L_1}{L_3}$$

may be varied so that the characteristic straight line D can assume different positions as indicated in FIGURE 3.

When the parameters $L_1$ and $R_1$ are zero, that is to say when the circuit 4 shown in FIGURE 1 is suppressed and if in these circumstances the voltage at the terminals 8 of the comparator 7 is equal to $u$, the characteristic straight line is represented by the straight line $D_1$ (FIGURE 3) passing through the origin of the co-ordinates. In this case the operation of the protective device is similar to that of a directional relay, because it compares the instantaneous polarities of the voltages $u$ and $u_2$, that is to say the instantaneous polarities of the voltage $u'$ and of the current $i'$ at the moment of the fault.

When the parameter $L_3$ is zero, that is, to say if the circuit 6 (FIGURE 1) comprises only the resistor 6' having the value $R_3$, the characteristic straight line is represented by the straight line $D_2$ (FIGURE 3) parallel to the abscissa OR, the ordinate of which is equal to $L_1$. In this case the operation of the protective device is similar to that of an inductance relay.

It is consequently possible to cause the concept of distance $x$ to appear between the station A and the fault. If in fact we designate by 1 the line inductance of the line, the product $u_4 \times u_2$ may be written as follows at the moment when $$u_3 = 0: \quad u_4 \times u_2 = L_2(lx - L_1)\left(\frac{di}{dt}\right)^2$$

so that if $$x > \frac{L_1}{l}$$

the product $u_4 \times u_2 > 0$ and if $$x < \frac{L_1}{l}$$

the product $u_4 \times u_2 < 0$.

When the parameter $R_3$ is zero, that is to say if the pulse generator 10 is fed only by the secondary winding 6''' of the mutual inductance forming part of the circuit 6, the characteristic straight line is represented by the straight line $D_3$, parallel to the ordinate OL, the abscissa of which is equal to $R_1$. In this case, the operation of the protective device is similar to that of a resistance relay.

It is seen from the foregoing that it is possible to determine the position of the fault in the line, because the position of the fault corresponds to a position of a point on a straight line and consequently it is necessary to know:

1° The abscissa, which is obtained with the aid of a distance relay;

2° The positive or negative half-axis in which this fault is produced, taking as origin the measurement point and an arbitrary positive supervision direction making it possible to define the concepts "upstream" and "downstream" which characteristise the faults.

This is, therefore, the role of the directional relay which is obtained when the parameters $L_1$ and $R_1$ are zero, as explained above.

The inductance relay which is constituted when the parameter $L_3$ is zero has the effect of measuring the distance at which the fault has been produced by measuring the inductance of the loop in which the fault occurred, a criterion which does not bring into action the variable, unknown resistance represented by the arc of the fault.

Figure 4:
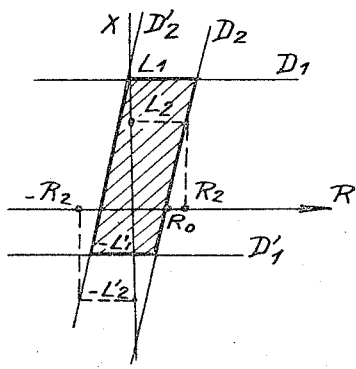
Figure 9:
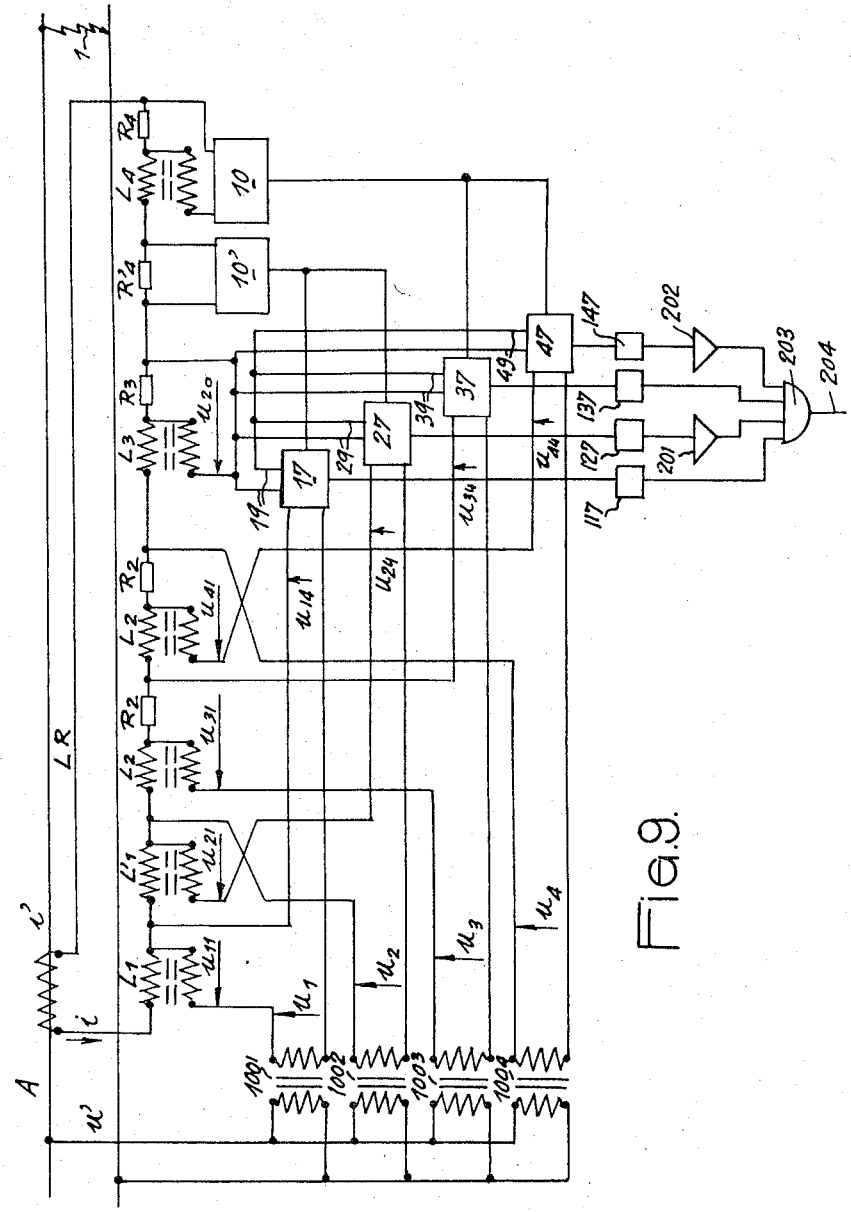
FIGURE 9 is a diagram of the installation of the protective device as constructed, depending on the definition of a triggering zone in the form of a parallelogram.

According to the invention as illustrated in FIGURE 9 it is possibe to utilise four protective devices similar to those described above. In fact, in this manner it is possible to obtain a zone of operation bounded by a closed surface having the shape of a parallelorgam. It is in fact established that a characteristic in the form of a closed surface, such as that illustrated in FIGURE 4, is particularly suitable for supervising a long line intended for operation with a heavy active load, because:

1° The figurative points of normal operation of the system corresponding to transmission of active power are generally situated in an angle of ±20° around the real axis ($L=0$);

2° The figurative points of the faults on the line are generally situated between 60° and 90° in relation to the real axis;

3° Any characteristic such that the protected zone in the 75° axis will be greater than the zone protected in the real axis makes it possible to extend the distance protected without fearing accidental triggering in the case of a heavy load.

In a parallelogram-shaped characteristic of this type, as illustrated in FIGURE 4, the sides of the parallelogram are defined by four straight lines parallel two by two, and the respective equations of which are, taking FIGURE 9 into account:

For the straight line $D_1$  $L-L_1=0$

For the straight line $D'_1$  $L+L_1=0$

For the straight line $D_2$  $\dfrac{L-L_2}{L_4}=\dfrac{R-R_2}{R_4}$

For the straight line $D'_2$  $\dfrac{L+L_2}{L_4}=\dfrac{R+R_2}{R_4}$

The straight lines $D_2$ and $D'_2$ are symmetrical in relation to the origin. The triggering zone has been hatched, that is to say the interior of the parallelogram, which may be defined by a system of four inequations written as follows:

$$L-L_1<0 \qquad (7)$$

$$L+L_1>0 \qquad (8)$$

$$\dfrac{L-L_2}{L_4}>\dfrac{R-R_2}{R_4} \qquad (9)$$

$$\dfrac{L+L_2}{L_4}<\dfrac{R+R_2}{R_4} \qquad (10)$$

This being true assuming that the resistances $R_2$, $R_4$ and the self-inductances $L_2$, $L_4$ in such a manner that $$\dfrac{L_2}{R_2}<\dfrac{L_4}{R_4}$$

Still considering FIGURE 9, it is seen that in the station A there have been installed four voltage transformers 1001, 1002, 1003, 1004 supplying voltages $u_1$, $u_2$, $u_3$, $u_4$.

Four polarity comparators similar to the comparator 7 illustrated in FIGURE 1 and designated by the references 17, 27, 37, and 47 are fed in parallel on the one hand by their terminals 19, 29, 39, and 49 with a voltage $u_{20}$ taken from the terminals of an image formed by a resistor $R_3$ and a mutual inductance $L_3$, and on the other hand respectively with voltages $u_{14}$, $u_{24}$, $u_{34}$, and $u_{44}$.

The voltage $u_{14}$ is the difference of the voltages $u_1-u_{11}$, $u_{11}$ being equal to $$L_1\dfrac{di}{dt}$$

$L_1$ being the mutual inductance appearing in FIGURE 9 under that reference.

The voltage $u_{24}$ is the difference $u_2-u_{21}$, where $u_{21}$ is equal to $$-L'_1\dfrac{di}{dt}$$

and therefore:

$$u_{14}=u_1-u_{11}=Ri+L\dfrac{di}{dt}-L_1\dfrac{di}{dt}$$

$$u_{24}=\varphi_2-u_{21}+Ri+L\dfrac{di}{dt}+L_1'\dfrac{di}{dt}$$

In the same manner, referring to FIGURE 9, the following can also be written:

$$u_{34}=u_3-u_{31}=Ri+L\dfrac{di}{dt}-R_{2i}-L_2\dfrac{di}{dt}$$

$$u_{44}=u_4-u_{41}=Ri+L\dfrac{di}{dt}+R_2i+L_2\dfrac{di}{dt}$$

but the output of the comparators 17 and 27 can be authorized only when $i=0$, and at that moment we can consequently write:

$$u_{20}=L_3\dfrac{di}{dt}$$

$$u_{14}=(L-L_1)\dfrac{di}{dt}$$

and therefore:

$$u_{20}\times u_{14}=L_3(L-L_1)\left(\dfrac{di}{dt}\right)^2$$

It is, therefore, seen that $u_{20}\times u_{14}$ is smaller than zero when $L-L_1$ is also smaller than zero.

It results therefrom that the polarity comparator 17 logically resolves the inequation (7).

Figure 8:
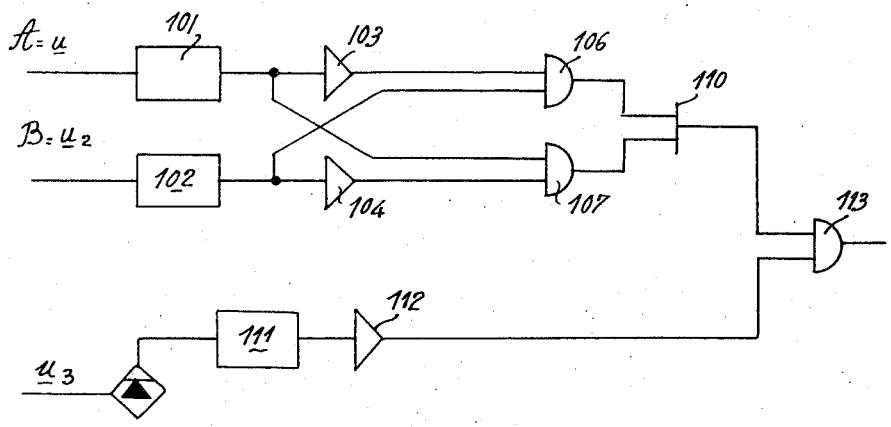
FIGURE 8 is a diagram of a logical circuit illustrating the combination of a polarity comparator and a pulse generator appearing in FIGURE 1.

Adopting the hypothesis that the output of the comparators is in logical state 1 when the product of the two voltages which they have to compare is negative, and that the output of the said comparators is in logical state zero when the product of the two said voltages to be compared is positive, the inequation (7) is resolved when the output of the comparator 17 is equal to 1, which is established on referring to the explanations given above with reference to FIGURE 8.

At the moments when $i=0$, we can write:

$$u_{20}=L_3\dfrac{di}{dt}$$

$$u_{24}=(L-L'_1)\dfrac{di}{dt}$$

and therefore:

$$u_{20}\times u_{24}=L_3(L+L'_1)\left(\dfrac{di}{dt}\right)^2$$

The inequation (8) is therefore dissolved when the output of the comparator 27 is in the logical zero state.

As has been explained with reference to FIGURE 1, the output of the comparators 37 and 47 can be authorized only when the voltage at the terminals of the pulse generator 10 is zero, because it is the pulse formed in that state of the pulse generator 10 which triggers the comparators 37 and 47, and consequently $$R_4i+L_4\left(\dfrac{di}{dt}\right)=0$$

and therefore $$\dfrac{di}{dt}=-\dfrac{R_4}{L_4i}$$

At the moments when the voltage is zero at the terminals of the pulse generator 10 we, therefore, have:

$$u_{34}=(R-R_2)i+(L-L_2)\left[\dfrac{R_4}{L_4}\right]i=R_4i\left[\dfrac{R-R_2}{R_4}-\dfrac{L-L_2}{L_4}\right]$$

$$u_{20}=R_3i+L_3\left[-\dfrac{R_4}{L_4}\right]i=R_4i\left[\dfrac{R_3}{R_4}-\dfrac{L_3}{L_4}\right]$$

and therefore:

$$u_{34}\times u_{20}=R_4^2i^2\left[\dfrac{R-R_2}{R_4}-\dfrac{L-L_2}{L_4}\right]\left[\dfrac{R_2}{R_3}-\dfrac{L_2}{L_3}\right]$$

The inequation (9) is therefore resolved when the output of the comparator 37 is in state 1.

In the same manner, and once again at the moments when $$\frac{di}{dt} = -\frac{R_4}{L_4}i$$

we have:

$$u_{20} = R_4 i \left[\frac{R_3}{R_4} - \frac{L_3}{L_4}\right]$$

$$u_{44} = R_4 i \left[\frac{R+R_2}{R_4} - \frac{L+L_2}{L_4}\right]$$

and therefore:

$$u_{44} \times u_{20} = R_4{}^2 i^2 \left[\frac{R+R_2}{R_4} - \frac{L+L_2}{L_4}\right]\left[\frac{R_2}{R_3} - \frac{L_2}{L_3}\right]$$

The inequation (10) is therefore resolved when the output of the comparator 47 is in the zero state:

In the end, in the arrangement comprising four similar protective devices illustrated in FIGURE 9, which devices define the parallelogram illustrated in FIGURE 4, the inequation system (7) to (10) is satisfied for any point inside said parallelogram of FIGURE 4, and is characterized by the coincidence of logical 0 states at the output of the comparators 27 and 47, and therefore of the monostable amplifier circuits 127 and 147, and by the logical 1 state at the output of the voltage comparators 17 and 37, and also at the output of the monostable amplifier circuits 117 and 137.

FIGURE 9 shows that the monostable amplifier circuits 117 to 147 are arranged in the same manner as the monostable circuit 12 in FIGURE 1.

201 and 202 are two inverter stages inverting the logical order of the monostable amplifiers 127 and 147, having the effect that the four inputs of a logical AND circuit 203 are in state 1 when the figurative point of the fault is inside the quadrilateral.

From the foregoing it results that the output 204 of the logical AND circuit 203 is equal to 1 for any point inside the parallelogram of FIGURE 4, and to the 0 state for any point outside this parallelogram.

It is seen from the foregoing that the maximum distance of line supervised corresponds to the inductance $L_1$, the ordinate of the straight line $D_1$ in FIGURE 4, and that the maximum fault resistance is $R_0$, the abscissa at the original of the straight line $D_2$.

Figure 5:
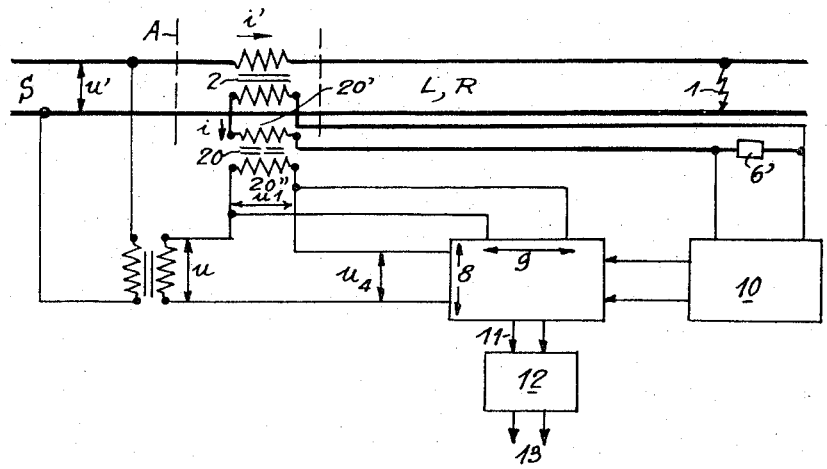
FIGURE 5 is a diagram of an alternative embodiment of the invention making it possible to compare the inductance of a line with a reference inductance, in the event of a fault between phases.

FIGURE 5 illustrates a modified embodiment in which the same reference numerals are used as in FIGURE 1 to designate the same elements. According to this modified embodiment, the distance of the fault 1 in relation to the station A where the protective device is connected is judged by the inductance of the defective loop.

The secondary winding of the current transformer 2 is closed on a circuit comprising a first winding 20' of a mutual inductance 20 and a resistor 6' connected in series with said mutual inductance.

$u_1$ designates the value of the instantaneous voltage which appears at the terminals of the second winding 20" of the mutual inductance 20, the coefficient of mutual inductance M of which is taken as reference magnitude.

The secondary winding of the voltage transformer 3 is connected in series with the winding 20" of the mutual inductance 20 and is connected to the terminals 8 of the instantaneous polarity comparator 7 in such a manner that the instantaneous voltage $u_4$ applied between the terminals 8 will be equal to $u - u_1$.

The secondary winding 20" of the mutual inductance 20 is likewise connected to the terminals 9 of the instantaneous polarity comparator 7. The pulse generator 10 is connected to the terminals of the resistor 6'.

According to this circuit arrangement, whatever the lax of variation of the current and voltage throughout the duration of the transient conditions which follow the appearance of a fault in the line, the instantaneous values of the electrical magnitudes $i, u, u_1, u_4$ are always expressed by the following relations:

$$u = Ri + L\left(\frac{di}{dt}\right)$$

$$u_1 = M\left(\frac{di}{dt}\right)$$

$$u_4 = u - u_1 = Ri + (L-M)\frac{di}{dt}.$$

At the moment when the current $i$ passes through a zero value, the voltage $u_4$ then has the following value:

$$u_4 = (L-M)\frac{di}{dt}.$$

According to one characteristic of the invention, the comparison of the sign of the polarities of the instantaneous values of the voltages $u_4$ and $u_1$ being effected in the comparator 7 at the moment when the current $i$ is zero makes it possible to know the sign of the expression $L-M$.

If the polarities of the voltages $u_4$ and $u_1$ are similar at the moment when the current $i$ passes through a zero value, the expression $L-M$ is positive, so that L is greater than M.

If on the contrary the polarities of the voltages $u_4$ and $u_1$ at the moment considered are different, the expression $L-M$ is negative and therefore L is smaller than M.

In view of the fact that the self-inductance L of the defective loop is proportional to the distance of the fault 1 in relation to the station A, the device illustrated in FIGURE 5 makes it possible to determine whether the fault is situated within or beyond a distance corresponding to the value of the coefficient of mutual inductance M, the mutual inductance 20 of which is taken as reference magnitude.

It is therefore seen on the one hand that the distance of the fault is solely determined by the value of the reactance or self-inductance of the defective loop and is independent of the resistance of the fault, and on the other hand that this measurement is obtained when the current in the defective loop first passes through zero, and that it is independent of the transient conditions which follow the appearance of the fault, and in particular that it is independent of the aperiodic components of the current and voltage.

Figure 6:
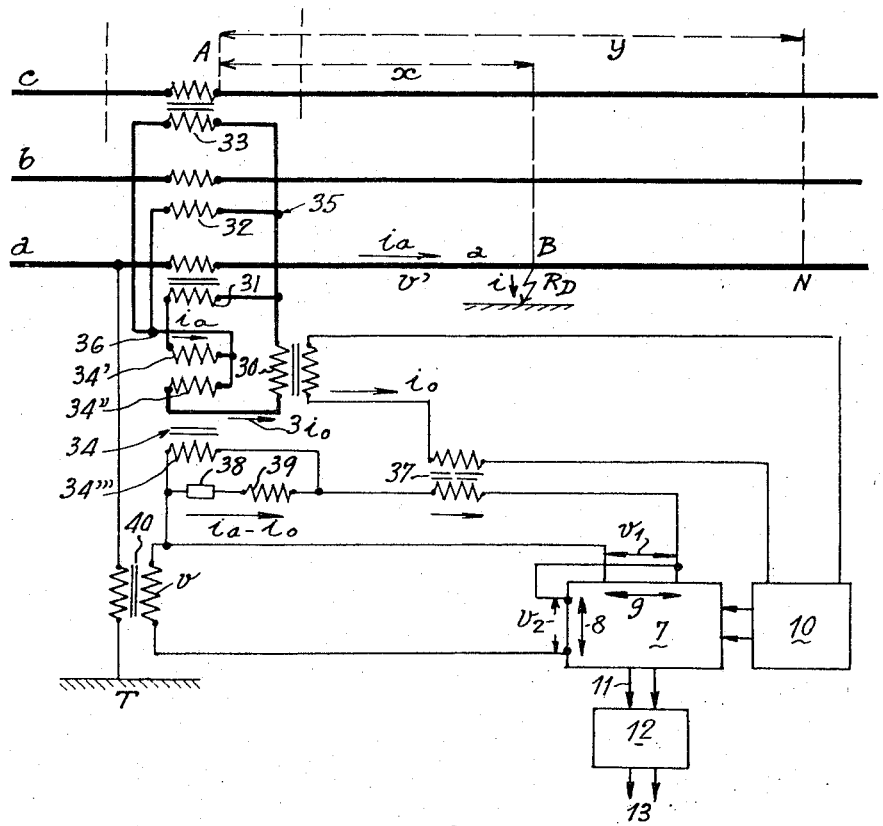
FIGURE 6 is a diagram illustrating the application of the device according to the invention to the protection of a three-phase line in the event of a fault between a phase and earth.

FIGURE 6, in which the same reference numerals have the same meaning as in FIGURES 1 and 5, illustrates the device according to the invention applied to the protection of the three-phase line $a, b, c$ in the event of a fault between a phase and earth.

This figure illustrates in detailed manner the circuit used for a fault between the phase $a$ and earth.

31, 32, 33 designate current transformers the primary windings of which are respectively connected to the phases $a, b, c$ of the line to be protected.

34 designates a current transformer having two primary windings, one of which (34') is in series with the secondary winding of the transformer 31.

The secondary winding of the transformer 31 in series with the primary winding 34' of the transformer 34, and also the secondary windings of the transformers 32 and 33 are connected in parallel. Between their two common points 35 and 36 there are connected in series, on the one hand, the primary winding of a current transformer 30 and, on the other hand, the second primary winding 34" of the transformer 34. This last-mentioned winding 34", the number of turns of which is one-third of the number of turns of the winding 34', is connected in opposition in relation to the latter. The secondary winding of the transformer 30 (the transformation ratio of which is ⅓) feeds the circuit of the pulse generator 10 and the primary winding of a mutual inductance 37. The secondary 34''' of the transformer 34 is connected to the terminals of a circuit containing in series a resistor 38 and an inductance 39. The circuit containing in series the resistor 38, the inductance 39, and the secondary winding of the mutual inductance 37 leads to the terminals 9 of the instantaneous polarity comparator 7.

40 designates a voltage transformer the primary winding of which is connected between the phase $a$ and earth and the secondary winding of which, in series with the circuit comprising the resistor 38, inductance 39, and secondary winding of the mutual inductance 37, is connected to the terminals 9 of the instantaneous polarity comparator 7.

The resistor 38 has a value $r$, $y$ corresponding to the resistance of a certain length $y$ of the line taken as reference from the station A, where the protective device is connected, to a point N, $r$ being the value of the resistance of the line per unit of length and per phase. The inductance 39 has a value 1, $y$ corresponding to the inductance of the line of a length $y$, 1 being the value of the inductance of the line per unit of length and per phase. The inductance, constituted by the secondary winding of the mutual inductance 37, has the value $l_o \cdot y$ corresponding to the homopolar inductance of the line of a length $y$, $l_o$ being the value of this inductance per unit of length and per phase.

It will be assumed that a fault of resistance $R_D$ takes place between the phase $a$ and earth at a point B, at a distance $x$ from the station A. This fault is traversed by a current $i$ and through its resistance brings about a voltage drop $v' = R_D \cdot i$.

In the station A the appearance of this fault gives rise to the circulation of a homoplanar current of the value $3i_o$ in the primary winding of the transformer 30 and in the primary winding 34'' of the transformer 34. The transformation ratio of the transformer 30 being ⅓, as already indicated, the current $i_o$ circulates in the circuit containing the primary of the mutual in that case 37 and leading to the input terminals of the pulse generator 10. A current $i_a$ circulates in the primary winding 34' of the transformer 34. The direction and the number of turns of the windings 34' and 34'' are determined so that a current equal to $i_a - i_o$ circulates in the circuit 38–39.

The instantaneous voltage at the terminals of this circuit is equal to:

$$y\left[r(i_a - i_o) + 1\frac{d(i_a - i_o)}{dt}\right]$$

The instantaneous voltage at the terminals of the secondary winding of the mutual inductance 37 is equal to:

$$y \cdot l_o \frac{di_o}{dt}$$

The instantaneous voltage $v_1$ at the terminals 9 of the instantaneous polarity comparator 7 is therefore equal to:

$$v_1 = y\left[r(i_a - i_o) + 1\frac{d(i_a - i_o)}{dt} + l_o\frac{di_o}{dt}\right] \quad (11)$$

The secondary winding of the voltage transformer 40 is connected to the circuit 38–39 and the secondary winding of the mutual inductance 37 in such a manner that the voltage $v_2$ at the terminals 8 of the instantaneous polarity comparator 7 will be equal to $v - v_1 = v_2$.

The voltage $v$ may be expressed as a function of the currents $(i_a - i_o)$, $i_o$ and $i$, taking into account the following considerations:

When a short-circuit occurs between the phase $a$ and earth, it is known that the following relations exist between the symmetrical components (direct, inverse, homopolar) of the voltage $v$. $v'$ and of the current $i_a$:

the indices $d$, $i$, $o$ signifying that these are direct, inverse, homopolar components of the aforesaid magnitudes.

In addition, the instantaneous values of the voltages $v_d$, $v_i$, $v_o$ are expressed as follows:

$$v_d = v'_d + x \cdot r \cdot i_d + x \cdot l\frac{di_d}{dt}$$

$$v_i = v'_i + x \cdot r \cdot i_i + x \cdot l\frac{di_i}{dt}$$

$$v_o = v'_o + x \cdot r_o \cdot i_o + x \cdot l_o\frac{di_o}{dt}$$

$x$, $y$, $r$, $l_o$, $l$ having the previously mentioned meanings and $r_o$ corresponding to the homopolar resistance per unit of length of line and per phase. Making a total of these three equalities, the instantaneous value of $v$ is obtained which after simplification is expressed as follows:

$$v = R_D \cdot i + x\left[r(i_a - i_o) + l \cdot \frac{d(i_a - i_o)}{dt} + r_o \cdot i_o + l_o\frac{di_o}{dt}\right] \quad (12)$$

According to one of the characteristics of the invention, when the pulse is supplied by the generator 10 and at the moment when the current $i_o$ becomes zero, the instantaneous voltage $v_1$ on the one hand and an instantaneous voltage $v_2$ equal to $v - v_1$, on the other hand are compared in the comparator 7. Substracting member by member the equalities (11) and (12) we obtain after simplification:

$$v_2 = R_D \cdot i + x \cdot r_o \cdot i_o + \left[\frac{x}{y} - i\right]v$$

The currents $i$ and $i_o$ are very substantially in phase because the homopolar impedance on each side of the fault have the arguments of values very close to one another so that the two currents pass simultaneously to zero.

In these circumstances, at the moment when the voltage at the terminals of the pulse generator 10 becomes zero because the current $i_o$ passes to zero, the instantaneous value of the voltage $v_2$ becomes:

$$\left(\frac{x}{y} - i\right)v$$

It follows that if the instantaneous voltages $v_2$ and $v$ are simultaneously positive or negative, that is to say if there is co-incidence of phase between these two voltages, the expression:

$$\frac{x}{y} - 1$$

is positive, and consequently $x$ is greater than $y$. The fault is situated beyond the length $y$ of the line which is taken as reference. If on the other hand the instantaneous voltages $v_2$ and $v$ are simultaneously positive in one case and negative in the other, the expression $$\frac{x}{y} - 1$$

is then negative, so that $x$ is smaller than $y$. The situation of the fault is between the station A and the point N.

The protective device illustrated in FIGURE 6 makes it possible to provide protection for a line against a fault between phase and earth by measuring the distance between the said fault and the station where the protective device is situated independently of the resistance $R_D$ of the fault.

The device as described relates to the measurement of the distance of a fault on the phase $a$. Similar devices are provided on the phases $b$ and $c$; their diagram of connection is easily deduced from FIGURE 6 by changing over the feed either for the phase $b$: the current $i_b$ and the voltage $v_b$, or for the phase $c$: the current $i_c$ and the voltage $v_c$.

In a three-phase assembly the elements fed by the homopolar current, such as for example the pulse generator 10, may obviously be common to the three protective devices of the three-phases.

The devices as described above always utilise a reference inductance or impedance which is the "image" of the inductance or impedance of a certain length of line.

What I claim is:

1. A distance protective device for A.C. fed lines comprising at least a current transformer and at least a voltage transformer respectively electrically connected to the line to be protected at the origin thereof, at least an instantaneous polarity comparator device having two inlets respectively electrically connected to said voltage transformer and to said current transformer by means of at least one reference impedance whereby said polarity comparator device is fed on one inlet with a current which is proportional to the fault current and on the other inlet with a voltage which is function of the voltage at the origin of said line, at least a generating pulse device electrically connected to said current transformer and to said polarity comparator device whereby said generating pulse device is supplied with a voltage which is proportional to the fault current and emits pulses or signals transmitted to said polarity comparator device when said voltage it receives becomes zero, a monostable amplifier electrically connected to said polarity comparator which emits a pulse for one only of the two signs that may have the algebraic product of the two voltages it receives and transmitting said pulse to said monostable amplifier device supplying in response an electric power and a shut off device for said line associated with said line and controlled by said electric power supplied by said monostable amplifier.

2. A device as set forth in claim 1 comprising two impedance circuits each having a mutual inductance and a resistance primary windings and resistances of said two impedance circuits being series connected with the secondary winding of said current transformer and secondary winding of said mutual inductance of the first impedance circuit being series connected with the secondary winding of said voltage transformer itself further electrically connected to a terminal of a first inlet of said polarity comparator device of which the second terminal of the same inlet is connected to outlet of said first impedance circuit, said polarity comparator device having the second inlet thereof connected by means of one of its terminals to the secondary winding of said mutual inductance of said second impedance circuit and by means of the other terminal circuit, whereby said polarity comparator device is caused to compare a first instantaneous voltage supplied by said second impedance circuit, fed by a current proportional to the fault current, with a second instantaneous voltage proportional to the difference between the voltage at the origin of the line and a voltage supplied by said first impedance circuit also fed with a current proportional to said fault current.

3. A device as set forth in claim 2 in which further it is provided a third impedance circuit having a mutual inductance and a resistance series connected with said first two impedance circuits, the secondary winding of mutual inductance of said third impedance circuit being electrically connected to an inlet terminal of said pulse generator and the other inlet terminal of said pulse generator being electrically connected to the outlet of said third impedance circuit whereby said pulse generator is fed with a voltage proportional to the fault current.

4. A device as set forth in claim 1 in which primary winding of a mutual inductance is series connected with a resistance and with said secondary winding of said current transformer, then in which said secondary winding of said voltage transformer is series connected with secondary winding of said mutual inductance and with terminals of a first inlet of said polarity comparator device of which terminals of second inlet are connected to both ends of said secondary winding of said mutual inductance while terminals of said pulse generating device controlling operation of said polarity comparator device are connected to both ends of said resistance series connected with said primary winding of said mutual inductance.

5. A device as set forth in claim 1 comprising four voltage transformers parallely connected with said line and four impedance circuits respectively associated therewith thus furnishing four distinct voltages respectively applied to one inlet of four polarity comparator devices the other inlet thereof is connected to a common reference impedance supplying a voltage proportional to the fault current said polarity comparator devices being controlled for two of them by means of a first pulse generator device connected to both ends of a reference resistance fed with a current proportional to the fault current and for two other of them by means of a second pulse generator device connected to both ends of a mutual inductance and of a series connected reference resistance also fed together by a current proportional to said fault current.

6. A device as set forth in claim 1 for the protection of a poly-phase line comprising for each phase protection as many current transformers as the line comprises phases, a supplemental current transformer having several primary windings and one secondary winding, the number of primary windings being equal to the number of phases and the first primary winding of said several primary winding current transformer being series connected with secondary winding of said protected phase current transformer and all primary windings of said several primary winding transformer being parallel connected with secondary windings of said current transformers of non protected phases further parallel connected secondary winding of said protected phase current transformer and further series connected, on one part, with primary winding of a current transformer mounted for feeding said pulse generator device and, on second part, with last primary winding of said several primary winding transformer of which secondary winding have with respect to the first primary winding a number of turns which is in inverse ratio to the number of phases of said line and likewise said secondary winding of said current transformer for the supplying of said pulse generator device have a transforamtion ratio equal to the inverse ratio to the number of phases, said secondary winding of said several primary winding transformer being connected to a circuit including said reference impedance for supplying one of said voltages to said polarity comparator device which voltage issues form said voltage transformer connected at one end to said phase to be protected and to other end to earth and which is further connected to second inlet of said polarity comparator device.

References Cited

UNITED STATES PATENTS

| | | | |
|---|---|---|---|
| 3,048,744 | 8/1962 | Warrington | 317—36 X |
| 3,192,442 | 6/1965 | Warrington et al. | 317—36 |

MILTON O. HIRSHFIELD, *Primary Examiner.*

J. L. TRAMMELL, *Assistant Examiner.*